US 9,224,088 B2

(12) United States Patent
Hazard (10) Patent No.: US 9,224,088 B2
(45) Date of Patent: *Dec. 29, 2015

(54) METHODS, SYSTEMS, AND COMPUTER PROGRAM PRODUCTS FOR SIMULATING A SCENARIO BY UPDATING EVENTS OVER A TIME WINDOW INCLUDING THE PAST, PRESENT, AND FUTURE

(71) Applicant: Christopher Hazard, Raleigh, NC (US)

(72) Inventor: Christopher Hazard, Raleigh, NC (US)

(73) Assignee: Christopher Hazard, Durham, NC (US)

( * ) Notice: Subject to any disclaimer, the term of this patent is extended or adjusted under 35 U.S.C. 154(b) by 604 days.

This patent is subject to a terminal disclaimer.

(21) Appl. No.: 13/632,646

(22) Filed: Oct. 1, 2012

(65) Prior Publication Data
US 2013/0030780 A1    Jan. 31, 2013

Related U.S. Application Data

(63) Continuation-in-part of application No. 12/171,047, filed on Jul. 10, 2008, now Pat. No. 8,280,707.

(51) Int. Cl.
*G06G 7/48* (2006.01)
*G06N 3/00* (2006.01)

(52) U.S. Cl.
CPC ..................... *G06N 3/006* (2013.01)

(58) Field of Classification Search
CPC .................................................. G06N 3/006
USPC ............................................................ 703/6
See application file for complete search history.

(56) References Cited

U.S. PATENT DOCUMENTS

| 5,395,242 | A | 3/1995 | Slye et al. |
| 6,231,443 | B1 | 5/2001 | Asai et al. |
| 6,419,581 | B2 | 7/2002 | Asai et al. |
| 6,549,893 | B1 * | 4/2003 | Lannert et al. .................. 706/60 |
| 6,549,896 | B1 | 4/2003 | Lannert et al. |
| 6,699,127 | B1 | 3/2004 | Lobb et al. |
| 7,996,296 | B2 | 8/2011 | Lange |
| 2005/0009608 | A1 | 1/2005 | Robarts |
| 2006/0167704 | A1 | 7/2006 | Nicholls et al. |
| 2007/0134639 | A1 | 6/2007 | Sada et al. |

OTHER PUBLICATIONS

ARS Technica "Mac OS X 10.5 Leopard: the Ars Technica Review: p. 14" downloaded Nov. 7, 2007 from http://arstechnica.com/reviews/os/mac-os-x-10-5.ars/14, 14 pp.
GameSpot Features, "The Greatest Games of All Time: Chrono Trigger" downloaded Nov. 7, 2007 from http://www.gamespot.com/features/614770/index.html?om_act=conver . . . , 3 pp.

(Continued)

*Primary Examiner* — Kamini S Shah
*Assistant Examiner* — Andre Pierre Louis
(74) *Attorney, Agent, or Firm* — Myers Bigel Sibley & Sajovec, PA (57) ABSTRACT

A scenario is simulated by providing an agent that is an object in the scenario, providing a time window for the scenario that spans the farthest reachable past time and the farthest reachable future time with respect to a present time for the agent and/or at least one player that interacts with the simulated scenario, providing at least one event that represents a change in at least one attribute of the agent, and updating a state of the scenario by applying the at least one event to the agent within the time window.

25 Claims, 7 Drawing Sheets

(56) References Cited

OTHER PUBLICATIONS

GameSpot"TimeShift Designer Diary#4—Multiplayer Mayhem in Slow Motion" downloaded Nov. 7, 2007 from http://www.gamespot.com/pc/action/timeshift/news.html?sid=6145628&print=1", 2 pp.
Halfbakery "Time Travel Computer Game" downloaded Nov. 7, 2007 from http://www.halfbakery.com/idea/time_20travel_20computer_20game, 6 pp.

Owezarskl et al. "A trace based method for realistic simulation" *2004 IEEE Conference on Communications*, 4:2236-2239 (2004).
International Search Report and Written Opinion, PCT Application No. PCT/US2009/003583, Dec. 30, 2009.
International Preliminary Report on Patentability corresponding to International Application No. PCT/US2009/003583; Date of Mailing: Jan. 20, 2011; 6 pages.

* cited by examiner

INCREMENTGLOBALTIMESTEP()

comment: increments the time for all updaters

TRANSLATEPLAYERINPUTTOEVENTS($updaters$)
for each $u \in updaters$
  do PREUPDATE($u$)
SORTUPDATERSBYTIME($updaters$)
$u \leftarrow$ EARLIESTUPDATER($updaters$)
comment: walk through updater list chronologically while $u \neq NULL$
do
  if $u.time < u.targetTime$
  then
    INCREMENTUPDATERTIMESTEP($u$)
    $t \leftarrow u.time$
    SORTUPDATERSBYTIME($updaters$)
    $u \leftarrow$ EARLIESTUPDATER($updaters$)
    comment: skip updaters before this time
    while $u \neq NULL$ and $u.time < t$
      do $u \leftarrow u.nextUpdater$
  else
    comment: did not increment time step
    comment: synchronize in case of overtake
    SYNCHAGENTS($u, u.prevUpdater$)
    $u \leftarrow u.nextUpdater$

FIG. 4

INCREMENTUPDATERTIMESTEP($u$)

comment: increments the time for a single updater

UPDATE($u$)
$u.time \leftarrow u.time + 1$
comment: if later updaters overlap, copy state
$c \leftarrow u.nextUpdater$
while $c \neq NULL$ do $\begin{cases} \text{if } u.time < c.time \\ \quad \text{then break} \\ \text{if } u.time = c.time \text{ or } c.time < c.targetTime \\ \quad \text{then COPYCURRENTDATA}(u, c) \\ \quad \text{else } \begin{cases} c.resynchRequired \leftarrow \text{true} \\ \text{SYNCHAGENTS}(c, c.prevUpdater) \end{cases} \\ c \leftarrow c.nextUpdater \end{cases}$

*FIG. 5*

SYNCHAGENTS($u, prev$)

comment: makes $u$ consistent w.r.t. $prev$ comment: requires $u.time > prev.time$ if ABOUTTOBEOVERTAKEN($u$)
or $u.resynchRequired = $ true then $\begin{cases} \text{for } i \leftarrow 0 \text{ to } |u.agents| - 1 \\ \quad \text{do } u.agents[i] \leftarrow \text{GETEVENT}(prev, i, u.time) \\ \text{REBUILDPHYSICSSTRUCTURES}(u) \\ \text{if } u.time = prev.time \\ \quad \text{then COPYSTATISTICS}(u, prev) \\ u.resynchRequired \leftarrow \text{false} \end{cases}$ else $\begin{cases} \text{for } i \leftarrow 0 \text{ to } |u.agents| - 1 \\ \quad \text{do } \begin{cases} \text{if } prev.agent[i] = NULL \\ \quad \text{and } u.agents[i] \neq NULL \\ \quad \text{then } \begin{cases} u.agents[i] \leftarrow NULL \\ rebuildRequired \leftarrow \text{true} \end{cases} \\ \text{if } prev.agent[i] \neq NULL \\ \quad \text{and } u.agents[i] = NULL \\ \quad \text{then } \begin{cases} u.agents[i] \leftarrow \\ \quad \text{GETEVENT}(prev, i, u.time) \\ rebuildRequired \leftarrow \text{true} \end{cases} \end{cases} \\ \text{if } rebuildRequired \\ \quad \text{then REBUILDPHYSICSSTRUCTURES}(u) \end{cases}$

METHODS, SYSTEMS, AND COMPUTER PROGRAM PRODUCTS FOR SIMULATING A SCENARIO BY UPDATING EVENTS OVER A TIME WINDOW INCLUDING THE PAST, PRESENT, AND FUTURE

CROSS REFERENCE TO RELATED APPLICATION

This application is a continuation-in-part of U.S. application Ser. No. 12/171,047, filed Jul. 10, 2008 (now U.S. Pat. No. 8,280,707), the disclosure of which is hereby incorporated herein by reference as if set forth in its entirety.

BACKGROUND

The present invention relates to systems, methods, and computer program products for simulating scenarios and, more particularly, to systems, methods, and computer program products for simulating scenarios in which agents and/or players/users can travel through time.

Computer simulation or computer modeling may involve the use of one or more computer programs that run on a computer or network of computers that attempts to simulate an abstract model of a particular system. Computer simulations may be used in a variety of different technological fields including mathematics, physics, chemistry, biology, economics, psychology, and other fields to obtain a greater understanding into how these systems operate and/or to simply observe their behavior. Computer simulations may run for a short period of time or may even involve many computers running for extended periods of time. In some simulations, users or players may participate in the simulation by providing input at various times to change the simulation environment. Some simulations may be used for entertainment purposes in the form of video games in which players can affect the outcomes of various events and compete with each other in accordance with the rules of the game.

SUMMARY

According to some embodiments of the present invention, a method of simulating a scenario includes providing an agent that is an object in the scenario, providing a time window for the scenario that spans the farthest reachable past time and the farthest reachable future time with respect to a present time for the agent and/or at least one player that interacts with the simulated scenario, providing at least one event that represents a change in at least one attribute of the agent, and updating a state of the scenario by applying the at least one event to the agent within the time window.

In other embodiments, the at least one event takes place prior to the present time.

In still other embodiments, the at least one event takes place after the present time.

In still other embodiments, the scenario is simulated at a first time rate and wherein updating the state of the scenario comprises updating the state of the scenario at a second time rate in a forward time direction such that a ratio of the second time rate to the first time rate is ≥1.0.

In still other embodiments, the scenario is simulated at a first time rate and wherein updating the state of the scenario comprises updating the state of the scenario at a second time rate in a forward time direction such that a ratio of the second time rate to the first time rate is ≥0 and <1.

In still other embodiments, the scenario is simulated at a first time rate and wherein updating the state of the scenario comprises updating the state of the scenario at a second time rate in a backward time direction such that a ratio of the second time rate to the first time rate is <0.

In still other embodiments, the method further includes providing a script that determines actions performed by the agent.

In still other embodiments, the actions performed by the agent further comprise forced actions that are triggered based on at least one condition being satisfied that cannot be controlled by the agent and/or actions that are responsive to an action of another agent.

In still other embodiments, the method further includes chronoporting the agent to a different point in time, creating a clone of the agent at the different point in time, and destroying the original agent from the original point in time forward.

In still other embodiments, the method further includes using the agent to create a second agent after simulating the scenario has begun.

In still other embodiments, the method further includes issuing a command via the at least one player to the agent.

In still other embodiments, the method further includes changing a time position of the at least one player before issuing the command to the agent.

In still other embodiments, the command negates another command preventing an action associated with the another command from occurring.

In still other embodiments, the method further includes limiting the ability of the at least one player to issue commands prior to and/or after the present time.

In still other embodiments, a plurality of players interact with the simulated scenario and updating the state of the scenario includes updating the state of the scenario by applying the at least one event to the agent within the time window for a first one of the plurality of players and updating the state of the scenario by applying the at least one event to the agent within the time window for a second one of the plurality of players.

In still other embodiments, updating the state of the scenario for the first one of the plurality of players occurs at a first time rate and updating the state of the scenario for the second one of the plurality of players occurs at a second time rate that is different from the first time rate.

In still other embodiments, the method further includes copying the at least one event to a later time corresponding to an original time of the at least one event plus a snapshot interval when the agent has been idle for the time between the original time of the at least one event and the later time.

In still other embodiments, the at least one player is an Artificial Intelligence (AI) system.

In still other embodiments, updating the state of the scenario comprises updating the state of the scenario using a plurality of updaters that are spaced apart in time in the time window.

In still other embodiments, updating the state of the scenario comprises updating the state of the scenario from multiple time position offsets in the window simultaneously.

Although described above primarily with respect to method aspects of the present invention, it will be understood that the present invention may be embodied as methods, systems, and/or computer program products.

DETAILED DESCRIPTION OF EXEMPLARY EMBODIMENTS

Specific exemplary embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular exemplary embodiments illustrated in the accompanying drawings is not intended to be limiting of the invention. In the drawings, like numbers refer to like elements.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be embodied as methods, systems, and/or computer program products. Accordingly, the present invention may be embodied in hardware and/or in software (including firmware, resident software, micro-code, etc.). Furthermore, the present invention may take the form of a computer program product comprising a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Some embodiments of the present invention may provide for the simulations of scenarios in which players/users of the simulation system along with agents, which are objects in the simulation, may travel forward and backward through time. Each player/user may have an updater process/thread that traverses the valid time window in which time travel is allowed to process events that affect the agents therein. The simulation system, according to some embodiments of the present invention, may allow for the combination of input from multiple users to collaboratively construct a plan of action for a large and complex system. Users/players may use the interface and methods to continually update, add to, and/or enhance plans of execution for industrial planning, search and rescue operations, military maneuvers, and the like. Users/players may see relatively quickly the repercussions of different changes and how these changes fit in with the plans of other users/players.

In other embodiments, the simulation system may be used in conjunction with an Artificial Intelligence (AI) system. In these embodiments, the AI system is in effect a user/player that can build, test, and undo hypothetical plans on the simulation system to evaluate how they affect each other and allow for continual updating of a database of current and hypothetical plans for the AI system.

Figure 1:
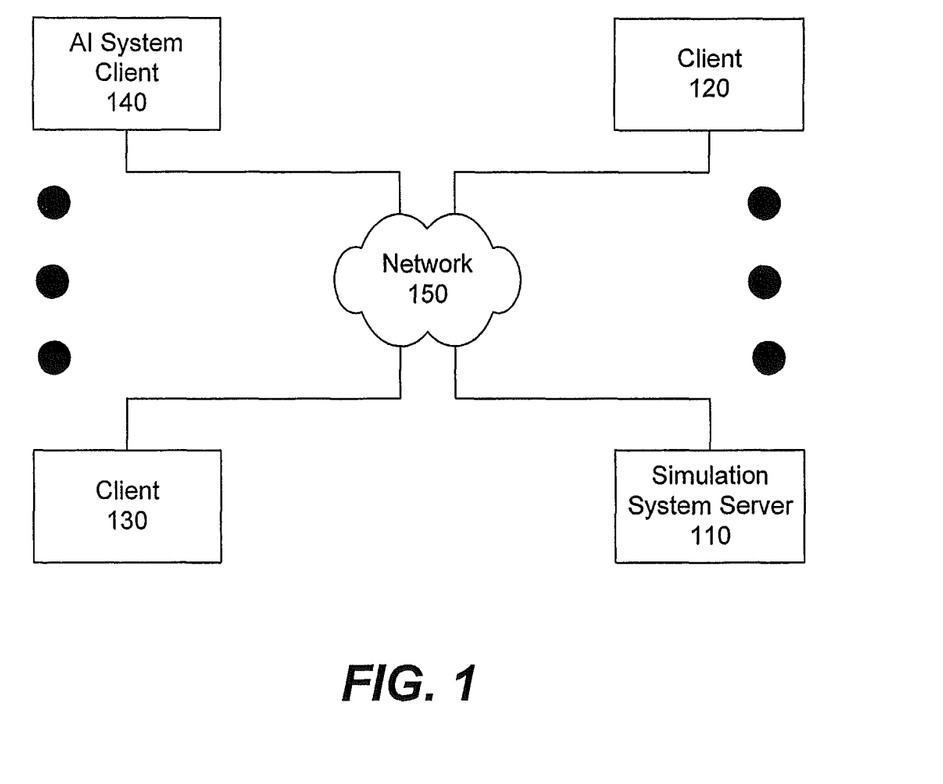
FIG. 1 is a block diagram of a communication network for simulating a scenario in accordance with some embodiments of the present invention.

Referring to FIG. 1, a communication network, in accordance with some embodiments of the present invention, comprises a simulation system server 110, a first client 120, a second client 130, and an AI system client 140 that are coupled via network 150 as shown. The network 150 may be a global network, such as the Internet or other publicly accessible network. Various elements of the network may be interconnected by a wide area network, a local area network, an Intranet, and/or other private network, which may not accessible by the general public. Thus, the network 150 may represent a combination of public and private networks or a virtual private network (VPN). In other embodiments, the first client, 120, the second client 130, and/or the AI system client 140 may be directly coupled to the simulation system server 110. The simulation system server 110 may be configured to simulate scenarios and provide for time travel for users/players of the simulation system along with agents that are objects of the simulation. The first client 120, second client 130, and the AI system client 140 are associated with users/players of the simulation system. The first and second clients 120 and 130 may be implemented as any device/system capable of providing an interface to the simulation system server 110. These devices may include, but are not limited to, computers, Personal Digital Assistants (PDAs), mobile devices, intelligent terminals, dumb terminals, and the like. It will be appreciated that each of the simulation system sever 110 and the AI system client 140 may be implemented as a single server, separate servers, or a network of servers either co-located in a server farm, for example, or located in different geographic regions. Although two clients and a single AI system client are shown in FIG. 1, it will be understood that fewer or additional clients may be used in accordance with various embodiments of the present invention.

As shown in FIG. 1, some embodiments according to the invention can operate in a logically separated client side/server side-computing environment, sometimes referred to hereinafter as a client/server environment. The client/server environment is a computational architecture that involves a client process (i.e., clients 120, 130, and 140) requesting service from a server process (i.e., repositories simulation system server 110). In general, the client/server environment maintains a distinction between processes, although client and server processes may operate on different machines or on the same machine. Accordingly, the client and server sides of the client/server environment are referred to as being logically separated. Usually, when client and server processes operate on separate devices, each device can be customized for the needs of the respective process. For example, a server process can "run on" a system having large amounts of memory and disk space, whereas the client process often "runs on" a system having a graphic user interface provided by high-end video cards and large-screen displays.

The clients and servers can communicate using a standard communications mode, such as Hypertext Transport Protocol (HTTP), SOAP, and/or XML-RPC. According to the HTTP request-response communications model, HTTP requests are sent from the client to the server and HTTP responses are sent from the server to the client in response to an HTTP request. In operation, the server waits for a client to open a connection and to request information, such as a Web page. In response, the server sends a copy of the requested information to the client, closes the connection to the client, and waits for the next connection. It will be understood that the server can respond to requests from more than one client. In some embodiments, such as gaming applications, for example, where there may be an emphasis on speed, the connections between the client and server processes may stay open for an entire session instead of using the request-response model of HTTP.

Although FIG. 1 illustrates an exemplary communication network, it will be understood that the present invention is not limited to such configurations, but is intended to encompass any configuration capable of carrying out the operations described herein.

Figure 2:
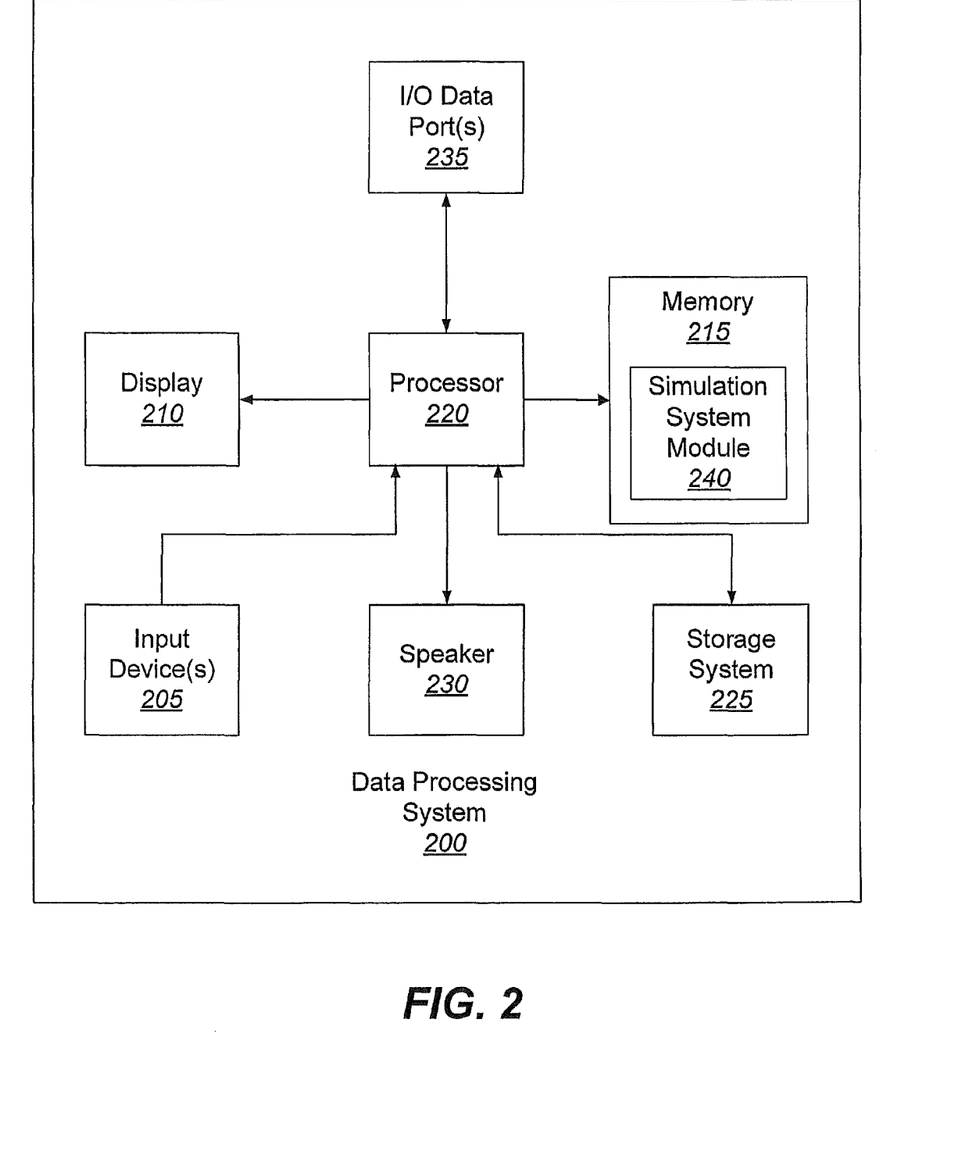
FIG. 2 is a block diagram that illustrates a data processing system in accordance with some embodiments of the present invention.

FIG. 2 illustrates a data processing system 200 that may be used, for example, to implement the simulation system server 110 of FIG. 1 and may include a module for simulating scenarios, in accordance with some embodiments of the present invention. The data processing system 200 comprises input device(s) 205, such as a keyboard or keypad, a display 210, and a memory 215 that communicate with a processor 220. The data processing system 200 may further comprise a storage system 225, a speaker 230, and an I/O data port(s) 235 that also communicate with the processor 220. The storage system 225 may include removable and/or fixed media, such as floppy disks, ZIP drives, hard disks, or the like as well as virtual storage such as a RAMDISK. The I/O data port(s) 235 may be used to transfer information between the data processing system 200 and another computer system or a network (e.g., the Internet). These components may be conventional components, such as those used in many conventional computing devices, and their functionality, with respect to conventional operations, is generally known to those skilled in the art. The memory 215 may be configured with a simulation system module 240 that may be used to simulate scenarios in accordance with some embodiments of the present invention.

Figure 3:
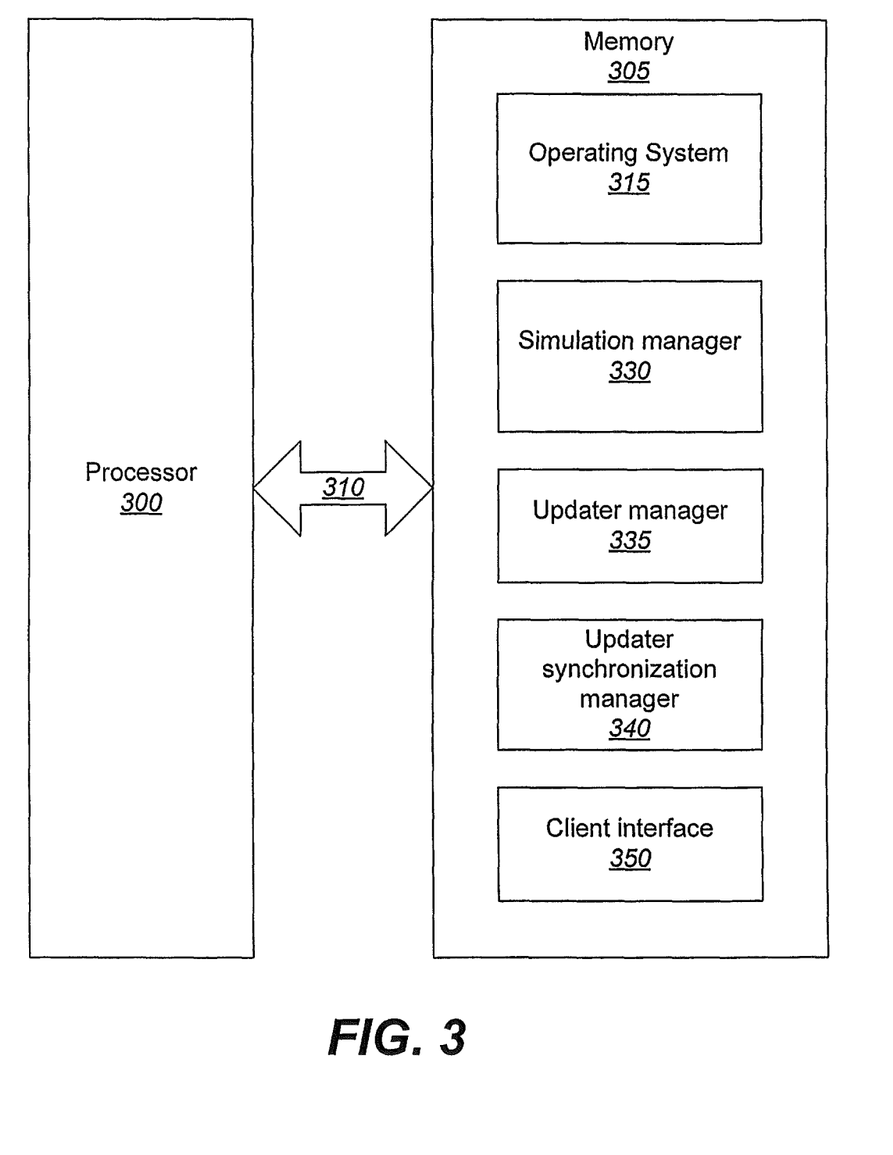
FIG. 3 is a block diagram that illustrates a software/hardware architecture for simulating a scenario in a data processing system in accordance with some embodiments of the present invention.

FIG. 3 illustrates a processor 300 and memory 305 that may be used in embodiments of data processing systems, such as the data processing system 200 of FIG. 2, for simulating scenarios in accordance with some embodiments of the present invention. The processor 300 communicates with the memory 305 via an address/data bus 310. The processor 300 may be, for example, a commercially available or custom microprocessor. The memory 305 is representative of the one or more memory devices containing the software and data used to provision software in accordance with some embodiments of the present invention. The memory 305 may include, but is not limited to, the following types of devices: cache, ROM, PROM, EPROM, EEPROM, flash, SRAM, and DRAM.

As shown in FIG. 3, the memory 305 may contain up to five or more categories of software and/or data: an operating system 315, a simulation manager module 330, an updater manager module 335, an updater synchronization manager module 340, and a client interface module 350. The operating system 315 generally controls the operation of the data processing system. In particular, the operating system 315 may manage the data processing system's software and/or hardware resources and may coordinate execution of programs by the processor 300. The simulation manager module 330 may be configured to move the entire simulation forward in time based on time steps or increments. As discussed above, each player/user of the simulation system may have an updater process/thread that traverses the valid time window in which time travel is allowed to process events that affect the agents therein. The updater manager module 335 may be configured to move each updater through the valid time window in accordance with each updater's temporal rate and direction. The updater synchronization manager module 340 may be configured to ensure that multiple updaters contain consistent data. The client interface module 350 may be configured to provide the graphical display, audio, and/or text of the simulated scenarios to a client device and also to receive input from the client device for use in the simulated scenarios.

Although FIG. 3 illustrates exemplary hardware/software architectures that may be used in data processing systems, such as the data processing system 200 of FIG. 2, for simulating scenarios, it will be understood that the present invention is not limited to such a configuration but is intended to encompass any configuration capable of carrying out operations described herein. Moreover, the functionality of the data processing system 200 of FIG. 2 and the hardware/software architecture of FIG. 3 may be implemented as a single processor system, a multi-processor system, or even a network of stand-alone computer systems, in accordance with various embodiments of the present invention.

Computer program code for carrying out operations of data processing systems discussed above with respect to FIG. 3 may be written in a high-level programming language, such as Python, Java, C, and/or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Various elements associated with the simulation manager module 330, the updater manager module 335, the updater synchronization manager module 340, and the client interface module 350, in accordance with some embodiments of the present invention, will now be described.

Agent: an object in the simulation that can either enact change on its own, be changed dynamically, or both. An agent may be embodied within the simulation as a unit (person, vehicle, etc.), or a disembodied entity for monitoring or controlling the simulation (e.g. determining when a foe has been defeated and ending the simulation). A disembodied agent is an agent that exists in the simulation, can affect other agents in the simulation, but either cannot be directly affected by agents within the simulation or, if so, only in limited and defined ways. An example of a disembodied agent is the weather. Another example of a disembodied agent is one or more triggers that determine when a player has won a level, beat an opponent, or caused some event that triggers progression of the story. A third example of a disembodied agent is that of player resources, such as the amount of money one has in an account or a current score.

Agent action: an action performed by an agent either under its own volition, because of a forced action, or because of an action of another agent. An action may take time or it may be instantaneous. If an action takes time, it may have an accompanying animation for its representation in the simulation. When an action occurs, an event is created for each agent involved in the action. Actions may be built from a program of atomic/basic action steps allowed by the simulation, may be parameterized, and may have preconditions. Each type of agent has a set of actions that it may perform.

Agent cross-section: the most recent event for every agent with respect to a given time.

Agent scripts: the set of scripts corresponding to a given agent type that determine the agent type's controls and behavior. Agent scripts can initiate actions that the agent is allowed to perform and access data about other agents and the simulation as a whole as corresponding rules (agents' or simulation's) permit. These scripts may have access to libraries within the engine, such as random number generation, planning algorithms, search algorithms, and may be as simple as just performing an action to as complex as advanced AI algorithms.

Action time: the amount of time an action takes until it is complete. At every time and for every agent, the simulation determines both the total time for an action to complete and the current progress in completing that action from the most recent event data.

Chronoport: the act of an agent jumping to a different position in time. Chronoporting is akin to teleporting, only with respect time. When an agent is chronoported, a new agent is created as a clone of the chronoportee, the chronoportee is destroyed from that time onward, and the two agents are linked together for management and propagation of information. Chronoporting may primarily be used for gaming applications.

Creation event: the event whereupon an agent is created. Any agent that does not exist at the beginning of the simulation is created by another parent agent. The two agents are irrevocably linked. If the timeline is changed so that the parent agent is destroyed before creating the child agent, the child agent will become uncreated and all of the child agent's events undone. An agent creation event occurs only at the time specified in the event.

Delete commands: the action of "ungiving" orders to agents within the simulation, which is akin to an undo. If a player changes time position and deletes commands to a given agent, then the agent will behave as if it had not been given those commands in the first place.

Event: a change to one or more attributes of an agent. Every agent action begins with an event.

Event data: a core set of data from which an agent can be completely described. Because an instance of this data structure may be stored for every event in the simulation over the time window, this data structure may be designed to enhanced efficiency considerations, such as bit packing, cache alignment, and the like. To completely construct an agent from a single event data, the simulation may use fields contained in the event data to look up static content (e.g., attributes, models, and animations), and/or generate dynamic information based on event data fields using procedural content generation techniques. Event data may be managed by being temporally sorted in a single or doubly linked-list for ease of traversal.

Engine client: the portion of the simulation software that displays the interface and simulation content to each player/user.

Engine server: the portion of the simulation software that runs the simulation, stores the event data, and computes the new states. The engine server communicates with each engine client. The engine server may be run on the same machine as the engine client, a separate machine, or distributed across a network of servers (in which case the engine server is the aggregate term for the group of servers) in accordance with various embodiments of the present invention.

Forced action: an agent's action that is automatically triggered when a set of preconditions is met outside of an agent's control. Forced actions may be instantaneous (e.g. discrete energy recovery events) or take time (e.g. when an agent is damaged, a component breaks off, and/or other physics-based interactions). In accordance with various embodiments of the present invention, a forced action may be a relatively simple or straightforward action or may be a complex operation that is based, for example, on AI algorithms.

Overtake: when one updater with a higher time multiplier advances its time past that of another. The overtake process begins when the earlier updater with the higher time multiplier comes within a snapshot interval time of the later updater, and lasts until the updater with the higher time multiplier is a snapshot interval ahead of the updater being overtaken.

Paradox: a set of events that is unstable across time. A paradox is unstable until the events fall off the end of the time window and the set of events collapses into one outcome. An example of a simple paradox is a factory constructs a robot, the robot travels back in time to before it was created, and then the robot prevents the factory from creating the robot in the first place. When the robot prevents the factory from creating it, the robot is never able to travel back in time to prevent the factory from creating the robot, thus the paradox.

Player: a person interacting with the simulation. Each player can communicate with some set of agents and control his/her current position on the timeline. Each player may also mark agents, locations, times, etc. in memory as bookmarks.

Present: a location on the time window that is considered the present time. The present time may have an updater associated with it and may be fixed at any location in the time window.

Snapshot event: a special event that prevents updaters from interfering with each other. This event is merely a clone of the previous event with timing and timestamps updated. If an agent has been idle for the length of time of a snapshot interval, then a snapshot event occurs. As an example, consider two updaters, one at 1 minute and one at 5 minutes. Suppose one particular agent sits idle most of the time, perhaps it is a tree. Now suppose that in the updater at minute 1, an agent in the simulation cuts down that tree (which had never happened in the timeline before). Without snapshots, the current event order in the timeline looks like:

>    create tree (time 0)–cut down tree (minute 1)

The updater at minute 5 now runs its timesteps. The updater at minute 5 cannot keep pointing to the create tree event because if it inserts another event to the tree it would be spliced out of time. Suppose an agent at time 5 cuts off a branch:

>    create tree (time 0)–cut off branch (minute 5)–
>       cut down tree (minute 1)

That is inconsistent and may be difficult to deal with efficiently. Suppose instead that the updater at minute 5 simply updates to the current event, namely the cut down tree event. To do so incurs two issues: First, the updater must re-traverse the event tree for every agent at every time step. Second, the rate at which events propagate through time may be inconsistent. An agent that undergoes many events (e.g., worker) may have its events propagate up to the future much more slowly than the tree.

Snapshots solve both of those issues by having events associated with idle agents happen regularly every snapshot interval.

Snapshot interval: the period of time between snapshot events. Higher intervals yield lower memory requirements, but increase the amount of synchronization between updaters when an overtake is occurring.

Timeline: the current set of events for a set of agents. The timeline may be changed when players and agents move throughout time. At important decision points, for example, the user or other internal process, script, or object can fork the timeline and play out two or more timelines in parallel. The timeline is split at that point and any updaters or time wave can travel down one split of the fork or the updater or time wave can split and travel down all or some forks at once. Each fork can contain the same events or different sets of events. A player or updaters/time wave can alternate between different forks on the timeline, looking at the world at each state and comparing how the world would be different with different sets of events, decisions, objects, etc. In some embodiments, branching timelines may be implemented by keeping track of when the timeline is forked and keeping references to all of the different forks, so that when an updater or time wave is at a time position, the update or time wave can determine which forks it should run on and whether it should split or perform different, possibly programmable, logic.

Time multiplier: the rate at which an updater moves through time. If set at 1.0, then the updater moves through time at the rate of time. Updaters that propagate time forward have a multiplier≥1.0. Player controlled updaters can have any time multiplier as long as the player's updater stays within the time window. Negative time multipliers are allowed if the event data are stored in a manner that can be traversed both forward and backward (e.g. doubly-linked). If the time multiplier is in a range between about zero and one, then the updater is in effect moving forward in time in slow motion. This may be used, for example, if too many events are happening too quickly in too short of a time interval.

Time statistics: aggregate measures of events occurring throughout the time window. Each player is shown some set of statistics relevant to their interactions with the simulation on the time slider. The statistics may be shown effectively using a bar chart or line graph.

Time slider: user interface feature that shows time statistics to depict events on the timeline, and used by the player to indicate a particular time. This interface feature can be used for moving the player's current time, chronoporting agents, etc.

Time step: a discrete step in time, the base unit of time (may be arbitrarily fine-grained).

Time window: the allowable time between which time travel is allowed for agents and players. This can be thought of as a sliding window of events, with one end being the farthest reachable past and the other end being the farthest reachable future. The time window may include unbounded time windows (infinite), logarithmic timelines, or other non-linear temporal mappings in accordance with various embodiments of the present invention.

Uncreated: when the timeline is changed such that an agent was prevented from being created.

Updater: a process/thread of execution (actual or virtual) that enacts change upon the timeline. An updater moves through the time window at the rate governed by its time multiplier. While moving forward, each updater clears events ahead of it and replaces them with recomputed events, which may or may not be different, depending on whether the timeline had changed. Each player may have its own updater, and a pool of unassociated updaters move forward throughout time bringing changes from the past up through the time window. Updaters in the aforementioned pool jump back to the beginning of the time window upon reaching the end of the time window. An updater may be referred to as a time wave The pool of unassociated updaters is the main mechanism that propagates changes in the timeline from the past to the future. The unassociated updater pool effectively has two primary parameters: the number of updaters and the speed of the updaters. Exemplary operations of the unassociated updaters may be illustrated by way of example. Suppose only one unassociated updater is used to propagate events from the past to the future and that its rate is set to twice the regular (wall clock) rate of time. Further suppose that the time window is 2 minutes long, player 1 is at 0:30, player 2 is at 1:30, and that the unassociated updater is at 1:00. Because the simulation involves some finite window of time (which can be arbitrarily long), the unassociated updater can be reused when it reaches 2:00 and sent back to 0:00. If player 1 makes a change to the timeline by issuing a command, then player 2 will not be affected by that change until the unassociated updater gets to 2:00, starts over at 0:00, updates past 0:30 taking in the new command issued by player 1, and then reaches the time that player 2 is now in. By the time the updater reached player 2, both player 2 and the updater would be at 4:00.

Now assume the same situation except that now 5 equally spaced unassociated updaters are used that move at twice the regular rate of time, currently at times 0:24, 0:48, 1:12, 1:36, and 2:00. Player 1's change will be caught and propagated to player 2 by the updater at time 0:24. In this case, the updater will reach player 2 at time 2:36, which is significantly earlier than 4:00.

If instead of using 5 unassociated updaters, one updater is used that moves through time at 3.272727 times the regular rate of time, then for this particular scenario, player 1's change would reach player 2 at the same time as having the 5 updaters that go through time at the twice the regular rate.

The relationship between the number of updaters and the speed of the updaters may have more complexities than just rate of propagation. If only one unassociated updater is used that moves through time very quickly, then it will catch all of the changes in the past and quickly bringing them to the future, making the changes more drastic. If many unassociated updaters are used that move through time only marginally faster than the rate of time, then the changes from the past will be brought more slowly to the future, but from the perspective of any given time, the changes will be more frequent but also smaller and more gradual.

When units themselves also move through time, their impacts can be much greater, particularly when paradoxes occur. If a small number of updaters move through time very quickly, then the entire system can quickly oscillate between states until the timeline stabilizes. If a unit X goes back in time and prevents itself from being created in the first place, then fast updaters may oscillate between the two states rapidly, whereas many slower updaters will still propagate events through time, but will not oscillate between the drastic states as quickly. For non-paradox situations, if the timeline has a fixed-point attractor, the faster updaters may bring the timeline into equilibrium more quickly and more drastically.

This trade off between number and speed of updaters makes for a continuum of results. The relationship is loosely approximated by: constant rate of propagation=number of updaters * speed of updaters, and increasing either the number or the speed of the updaters consumes more CPU time.

Also, in accordance with various embodiments of the present invention, it is possible to have different propagation patterns for the unassociated updaters other than just looping around. For example, updaters could fire off at a constant rate whenever a player is at a time other than present (or a variable rate based on how many new commands the player is issuing). In this case, a player might jump back in time 2 minutes, and every 20 seconds, a new updater is spawned from the player's current time. Once an updater reaches the end of the time window, it is destroyed.

In some embodiments of the present invention, updaters or time waves may propagate backward in time rewinding the time position of one or more time waves (updaters) of a simulation. As with forward moving updaters or time waves, the time waves moving backward in time can either update and process new events to reflect the new state of the simulation on the timeline or they can play back and show the current world state at that point in time. Further, backward moving updaters or time waves can carry and/or propagate data or in-game objects backward in time for data or in-game objects that are traveling backward in time. Thus, updaters or time waves that are able to reverse direction and move forward and backward in time can be used to enable more fluid dragging and updating of a time wave position on the timeline. In some embodiments, to support reversing the direction of updaters or time waves, a doubly-linked list may be maintained for all of the events on the timeline.

In some embodiments of the present invention, a single updater or time wave may advance objects/entities/data within the simulation at different rates as determined by different factors or attributes, such as location or status, in the simulation. For example, one object may be moving forward in time at a faster rate than another. The updater or time wave may update the objects based on different time deltas or the updater or time wave itself may branch into multiple time waves or widen its range of time values it looks at when updating the objects at different temporal positions or time rates. One exemplary use case of this is to simulate relativistic physics, where an object traveling at a high velocity will incur less elapsed time.

Simulation world: all of the non-dynamic entities in the simulation, such as immutable terrain.

Figure 4:
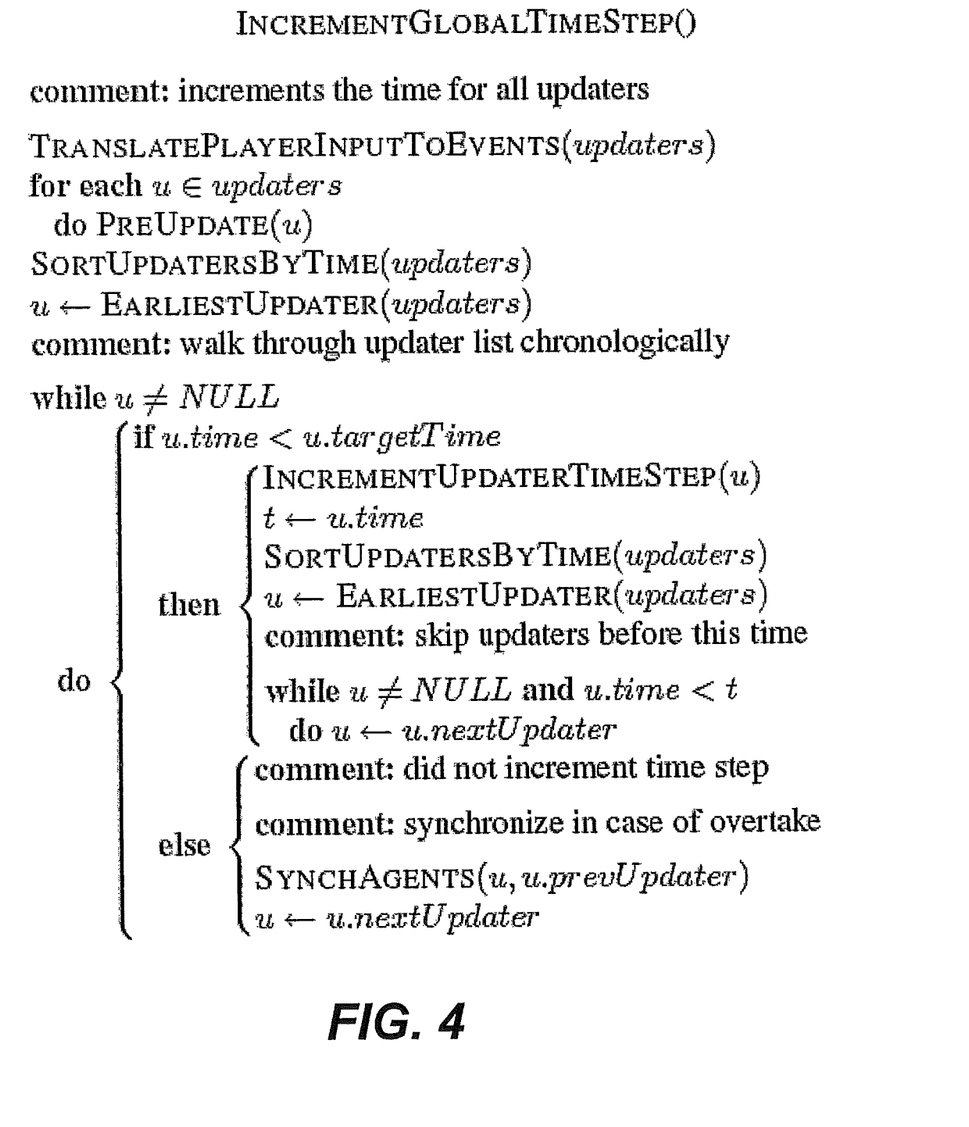
FIGS. 4-6 are pseudocode that illustrate operations of the simulation manager module, the updater manager module, and the updater synchronization manager module 340 of FIG. 3, respectively, in accordance with some embodiments of the present invention.
Figure 5:
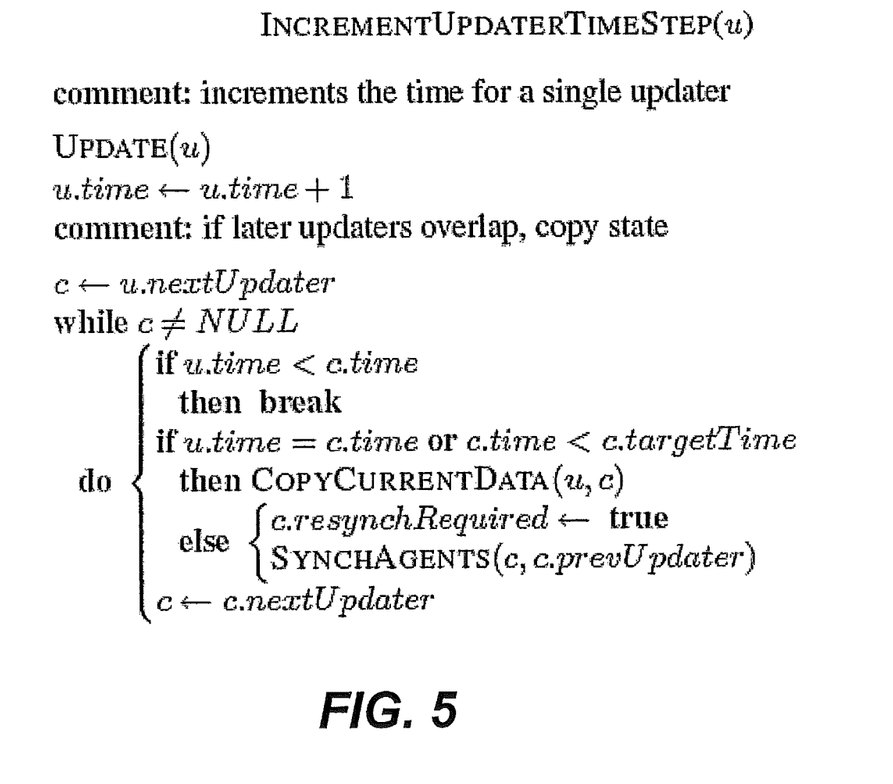
Figure 6:
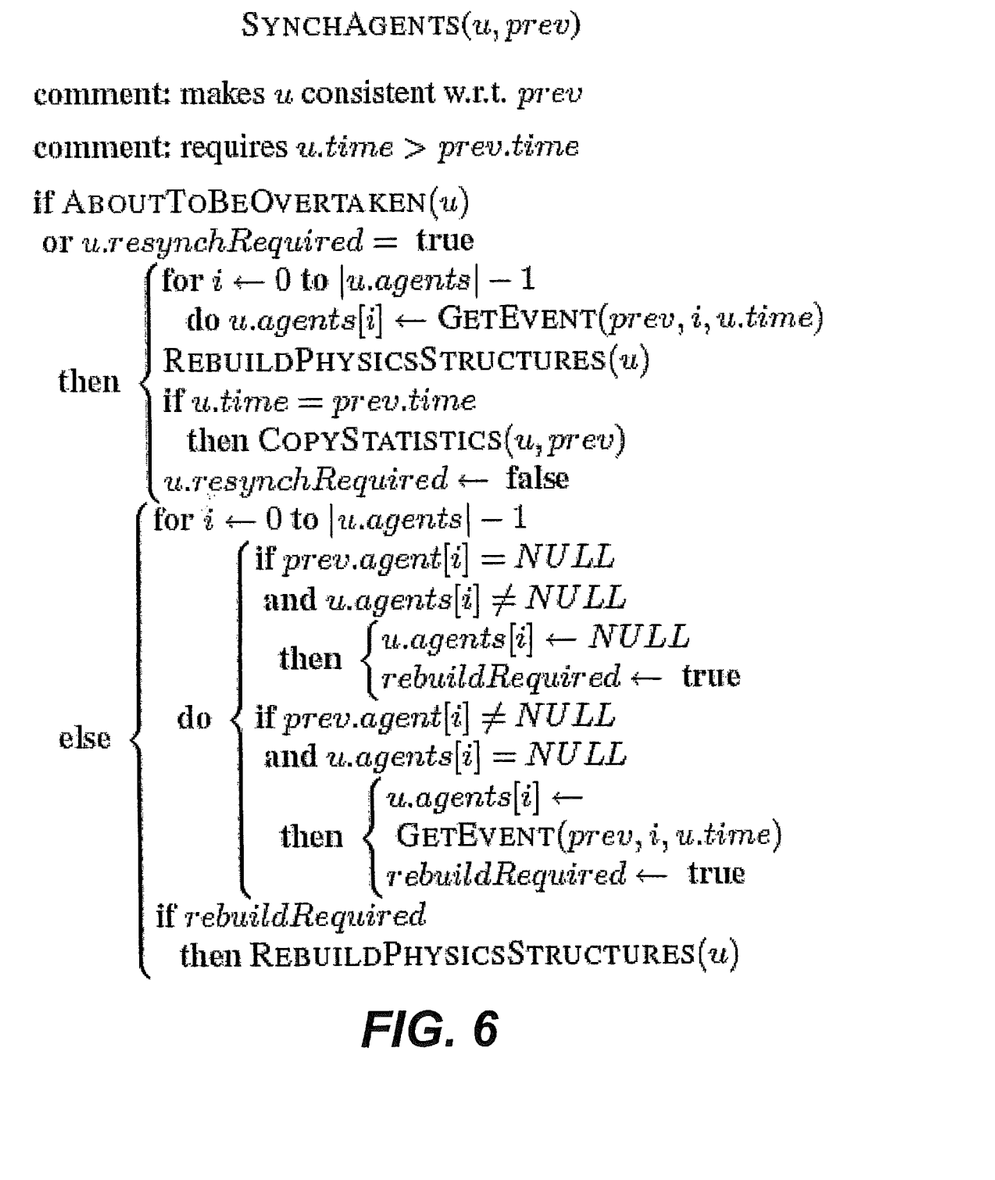

FIGS. 4-6 are pseudocode that illustrate operations of the simulation manager module 330, the updater manager module 335, and the updater synchronization manager module 340 of FIG. 3, respectively, in accordance with some embodiments of the present invention. Various methods/functions associated with the simulation manager module 330, the updater manager module 335, and the updater synchronization manager module 340, in accordance with some embodiments of the present invention, will now be described.

AboutToBeOvertaken(u): looks at updater u and returns true if another updater is within a snapshot interval of time behind it.

CopyCurrentData(u, v): copies the contents and data structures of updater u into updater v, ensuring that both updaters have identical data. This method/function may be used when a faster updater u is overtaking a slower updater v.

CopyStatistics(u, v): copies the current aggregate statistics from updater u into updater v.

Earliest Updater(updater s): returns the updater with the earliest time from the list updaters.

GetEvent(u, i, t): returns the latest event not exceeding time t for agent i, working forward from the data stored in updater u (worked forward from u to reduce traversal distance). If u is NULL, then the method/function traverses through the events from the beginning of the time window.

PreUpdate(u): determines how many time steps updater u should cover during the next global time step based on u's time multiplier. This method/function is also used to initialize synchronization with any engine clients currently viewing via this updater with the engine server.

RebuildPhysicsStructures(u): destroys and rebuilds any physics, visibility, or interactions structures that may be expensive to compute and are cached by the updater. For example, this may include oct-trees, visibility maps, and collision detection algorithms. These structures need to be able to be rebuilt from any point in time without replaying the entire timeline, both because of efficiency and because part of the timeline may no longer reside in memory.

SortUpdatersByTime(updaters): sorts the updaters based on their current time, u.time, and creates a doubly linked list using u.nextUpdater and u.prevUpdater.

TranslatePlayerInputToEvents(updaters): takes input from engine clients sent by players and translates them into events on the timeline. This may be done by endowing each player with a corresponding input managing agent in the simulation.

Update(u): computes the results of the next time step, inserting and removing events at the next time step accordingly. This method/function may ensure that the set of events is always the same given that all of the preceding events are the same. Pseudo-random numbers used in agents' actions, decisions, and procedural content must be consistent, and the event data structures involved must have the Markov property (memoryless).

Figure 7:
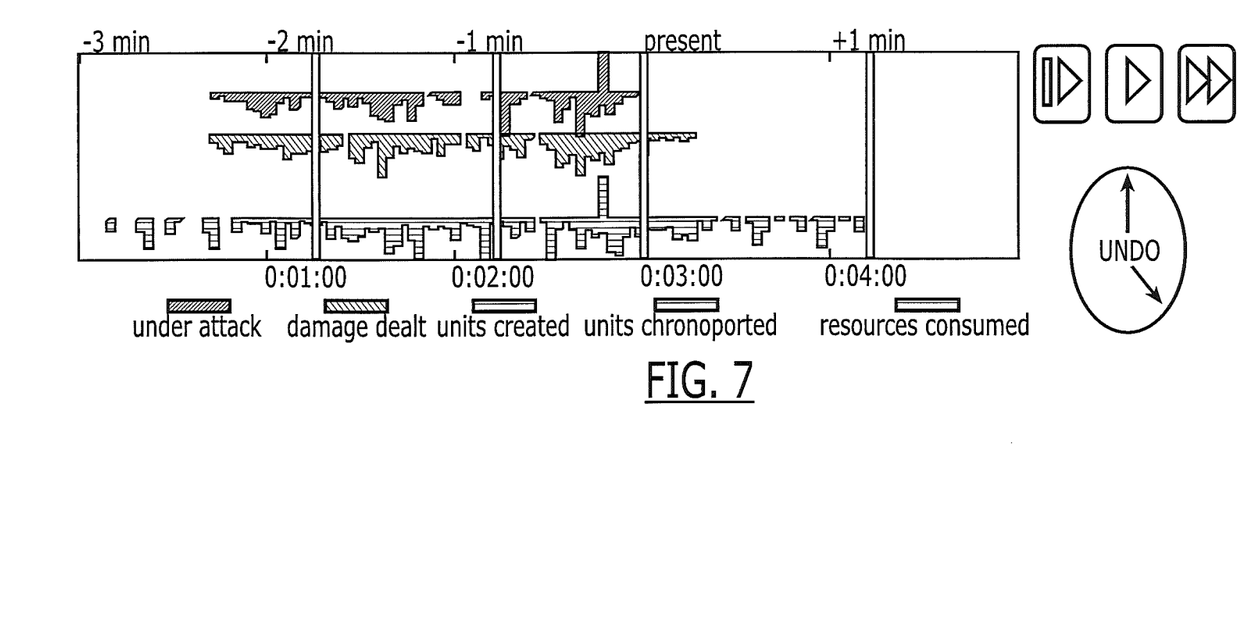
FIG. 7 is a display screen shot that illustrates operations of the client interface module of FIG. 3 in accordance with some embodiments of the present invention.

FIG. 7 is a display screen shot that illustrates operations of the client interface module 350 of FIG. 3 in accordance with some embodiments of the present invention. The top bar indicates the time relative to the present and the bottom bar indicates absolute time elapsed since the simulation began. The bright vertical lines indicate the current time of two players, one at the present, and the other about 1.5 minutes before present. The more faint vertical lines that fade out represent the updaters, each of which has a time multiplier greater than one and advance the updates along the timeline. The bright horizontal lines that change height represent a statistical representation of the events that are occurring at the given time. A player may place bookmarks in time to be able to jump back to given events. The controls on the right side of FIG. 7 may allow a player to change his/her own time multiplier to control the speed of progression through time. The undo button on the right side of FIG. 7 may allow a player to select a range of events for a selected set of agents and undo sending those agents the commands that the player had previously sent.

In some embodiments of the present invention, such as gaming applications or other competitive simulations, a user/player may be encouraged to spend more time in the present as opposed to playing at the oldest allowable point in time. In some embodiments, a player may be motivated to spend more time in the present through use of an energy that the player uses to send commands back in time. This energy is inaccessible to interactions within the game and is only available to the player/user. When the player is in the present, the energy may recharge. When issuing command to agents in the past, the energy is spent. In some embodiments, the amount of energy spent may be proportional to the amount of time traversed to reach the past time. When the player spends time in the future, the player's energy may be drained at a constant rate and the player is sent back to the present when the energy runs out. This may encourage players to focus game play around the present time, while still allowing players to take advantage of time travel.

In the drawings and specification, there have been disclosed exemplary embodiments of the invention. Although specific terms are used, they are used in a generic and descriptive sense only and not for purposes of limitation, the scope of the invention being defined by the following claims.

That which is claimed:

1. A method of simulating a scenario, comprising:
providing an agent that is an object in the scenario;
providing a time window for the scenario that spans the farthest reachable past time and the farthest reachable future time with respect to a present time for the agent and/or at least one player that interacts with the simulated scenario;
providing at least two events that each represent a change in at least one attribute of the agent; and
updating a state of the scenario by applying the at least two events to the agent within the time window, at different points, respectively, on the time window in any order selected from all permutations in ordering the at least two events by reversing time directions between a forward time direction and a backward time direction.

2. The method of claim 1, wherein one of the at least two events takes place prior to the present time.

3. The method of claim 1, wherein one of the at least two events takes place after the present time.

4. The method of claim 1, wherein the scenario is simulated at a first time rate and wherein updating the state of the scenario comprises updating the state of the scenario at a second time rate in the forward time direction such that a ratio of the second time rate to the first time rate is ≥1.0.

5. The method of claim 1, wherein the scenario is simulated at a first time rate and wherein updating the state of the scenario comprises updating the state of the scenario at a second time rate in the forward time direction such that a ratio of the second time rate to the first time rate is ≥0 and <1.

6. The method of claim 1, wherein the scenario is simulated at a first time rate and wherein updating the state of the scenario comprises updating the state of the scenario at a second time rate in the backward time direction such that a ratio of the second time rate to the first time rate is <0.

7. The method of claim 1, further comprising:
providing a script that determines actions performed by the agent.

8. The method of claim 7, wherein the actions performed by the agent further comprise forced actions that are triggered based on at least one condition being satisfied that cannot be controlled by the agent and/or actions that are responsive to an action of another agent.

9. The method of claim 1, further comprising:
chronoporting the agent from an original point in time to a different point in time;
creating a clone of the agent at the different point in time; and
destroying the agent from the original point in time forward.

10. The method of claim 1, further comprising:
using the agent to create a second agent after simulating the scenario has begun.

11. The method of claim 1, further comprising:
issuing a command via the at least one player to the agent.

12. The method of claim 11, further comprising:
changing a time position of the at least one player before issuing the command to the agent.

13. The method of claim 11, wherein the command negates another command preventing an action associated with the another command from occurring.

14. The method of claim 12, further comprising:
limiting the ability of the at least one player to issue commands prior to and/or after the present time.

15. The Method of claim 1, wherein a plurality of players interact with the simulated scenario and wherein updating the state of the scenario comprises:
updating the state of the scenario by applying the at least two events to the agent within the time window for a first one of the plurality of players; and
updating the state of the scenario by applying the at least two events to the agent within the time window for a second one of the plurality of players.

16. The method of claim 15, wherein updating the state of the scenario for the first one of the plurality of players occurs at a first time rate and updating the state of the scenario for the second one of the plurality of players occurs at a second time rate that is different from the first time rate.

17. The method of claim 15, further comprising:
copying one of the at least two events to a later time corresponding to an original time of the one of the at least two events plus a snapshot interval when the agent has been idle for the time between the original time of the one of the at least two events and the later time.

18. The method of claim 1, wherein the at least one player is an Artificial Intelligence (AI) system.

19. The method of claim 1, wherein updating the state of the scenario comprises updating the state of the scenario using a plurality of updaters that are spaced apart in time in the time window.

20. The method of claim 19, wherein updating the state of the scenario comprises updating the state of the scenario from multiple time position offsets in the window simultaneously.

21. A method of simulating a scenario, comprising:
providing an agent that is an object in the scenario;
providing a time window for the scenario that spans the farthest reachable past time and the farthest reachable future time with respect to a present time for the agent and/or at least one player that interacts with the simulated scenario;

providing a plurality of events that each represents a change in at least one attribute of the agent;

splitting the time window into a plurality of time windows; and updating a state of the scenario by applying the plurality of events to the agent, at different points, respectively, on the time window in any order selected from all permutations in ordering the plurality of events within at least one of the plurality of time windows.

22. The method of claim 21, wherein each of the plurality of time windows includes the plurality of events.

23. The method of claim 21, wherein one of the plurality of time windows includes the plurality of events and a second one of the plurality of time windows does not include the plurality of events.

24. The method of claim 21, wherein the at least one player alternates between interacting with the simulated scenario on respective ones of the plurality of time windows.

25. A method of simulating a scenario, comprising:

providing first and second agents that are objects in the scenario;

providing a time window for the scenario that spans the farthest reachable past time and the farthest reachable future time with respect to a present time for the agents and/or at least one player that interacts with the simulated scenario;

providing a plurality of events that each represent a change in at least one agent attribute, a first one of the plurality of events representing a change in at least one attribute of the first agent and a second one of the plurality of events representing a change in at least one attribute of the second agent;

updating a state of the scenario by applying the plurality of events to the first and second agents, at different points, respectively, within the time window in any order selected from all permutations in ordering the plurality of events;

wherein updating the state of the scenario comprises updating a state of the first agent at a first time rate and updating a state of the second agent at a second time rate, the first time rate being different than the second time rate.

* * * * *

UNITED STATES PATENT AND TRADEMARK OFFICE
CERTIFICATE OF CORRECTION

PATENT NO.        : 9,224,088 B2
APPLICATION NO.   : 13/632646
DATED             : December 29, 2015
INVENTOR(S)       : Christopher Hazard Page 1 of 1

It is certified that error appears in the above-identified patent and that said Letters Patent is hereby corrected as shown below:

In the Claims:
Column 14, Claim 15, Line 35: Please correct "The Method of"
                        to read -- The method of --

Signed and Sealed this
Fifth Day of July, 2016

Michelle K. Lee
*Director of the United States Patent and Trademark Office*